United States Patent
Kawamura et al.

(10) Patent No.: US 7,474,354 B2
(45) Date of Patent: Jan. 6, 2009

(54) IMAGE ANGLE DETECTION DEVICE AND SCAN LINE INTERPOLATION DEVICE HAVING THE SAME

(75) Inventors: Hideaki Kawamura, Moriyama (JP); Mitsuhiro Kasahara, Hirakata (JP); Tomoaki Daigi, Takatsuki (JP)

(73) Assignee: Panasonic Corporation, Osaka (JP)

( * ) Notice: Subject to any disclaimer, the term of this patent is extended or adjusted under 35 U.S.C. 154(b) by 911 days.

(21) Appl. No.: 10/509,678

(22) PCT Filed: Apr. 30, 2003

(86) PCT No.: PCT/JP03/05557

§ 371 (c)(1),
(2), (4) Date: Oct. 8, 2004

(87) PCT Pub. No.: WO03/096689

PCT Pub. Date: Nov. 20, 2003

(65) Prior Publication Data

US 2005/0140664 A1 Jun. 30, 2005

(30) Foreign Application Priority Data

May 7, 2002 (JP) ............................. 2002-131230
Apr. 28, 2003 (JP) ............................. 2003-123406

(51) Int. Cl.
*H04N 7/01* (2006.01)
*H04N 11/20* (2006.01)

(52) U.S. Cl. ...................... 348/448; 348/458
(58) Field of Classification Search ............ 348/448, 348/458, 581, 700, 452; 382/199, 203, 266, 382/299–301; 345/660; 358/1.2
See application file for complete search history.

(56) References Cited

U.S. PATENT DOCUMENTS

| 5,347,599 A | 9/1994 | Yamashita et al. |
| 5,796,437 A | 8/1998 | Muraji et al. |
| 5,886,745 A | 3/1999 | Muraji et al. |
| 6,262,773 B1 * | 7/2001 | Westerman ................. 348/448 |

(Continued)

FOREIGN PATENT DOCUMENTS

JP 2-213289 8/1990

(Continued)

OTHER PUBLICATIONS

English Language Abstract of JP 11-146346.

(Continued)

*Primary Examiner*—Victor R Kostak
(74) *Attorney, Agent, or Firm*—Greenblum & Bernstein, P.L.C.

(57) ABSTRACT

A binarizer binarizes a video signal input from an A/D converter and a video signal output from a line memory using an average luminance value provided from a detection window video signal processor as a threshold value, and outputs a binary pattern. A reference pattern generator generates a plurality of reference patterns. An angle detector compares the binary pattern with each of the plurality of reference patterns, and outputs the angle of a matched reference pattern as angle information. An arc shape detector outputs the edge angle information of a picture based on a combination of the angle information of an interpolation scanning line including an object interpolation pixel and the angle information of interpolation scanning lines above and below the interpolation scanning line.

10 Claims, 12 Drawing Sheets

U.S. PATENT DOCUMENTS

| | | | |
|---|---|---|---|
| 6,477,282 B1 * | 11/2002 | Ohtsuki et al. | 382/266 |
| 6,941,016 B1 * | 9/2005 | Wagman et al. | 382/199 |
| 7,016,539 B1 * | 3/2006 | Silver et al. | 382/216 |
| 7,245,326 B2 * | 7/2007 | Orlick | 348/448 |
| 2003/0011708 A1 | 1/2003 | Kawamura et al. | |

FOREIGN PATENT DOCUMENTS

| | | |
|---|---|---|
| JP | 5-153562 | 6/1993 |
| JP | 9-37214 | 2/1997 |
| JP | 11-041565 | 2/1999 |
| JP | 11-146346 | 5/1999 |
| JP | 11-331773 | 11/1999 |
| JP | 2000-253238 | 9/2000 |
| JP | 2003-052023 | 2/2003 |
| WO | 02/48965 | 6/2002 |

OTHER PUBLICATIONS

English Language Abstract of JP 2000-253238.
English Language Abstract of JP 11-041565.
English Language Abstract of JP 11-331773.
English Language Abstract of JP 2-213289.

* cited by examiner

| | DETECTED ANGLE IN LOWER INTERPOLATION SCANNING LINE | | DETECTED ANGLE OF INTERPOLATION PIXEL | | DETECTED ANGLE IN UPPER INTERPOLATION SCANNING LINE | | DIRECTION OF CONVEX PART OF ARC EDGE | DIRECTION OF INSIDE OF ARC SHAPE | EXAMPLES OF INTERIOR OF ARC SHAPE |
|---|---|---|---|---|---|---|---|---|---|
| A | 18° | ... | 27° | ... | 45° | ... | LOWER RIGHT | LEFT | 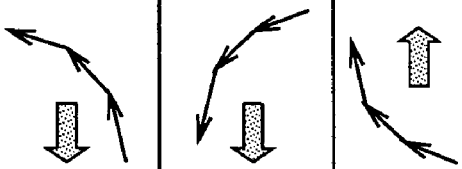 |
|   | 22° | ... | 34° | ... | 45° | ... | | | |
| B | −34° | ... | −22° | ... | −16° | ... | UPPER RIGHT | LEFT | 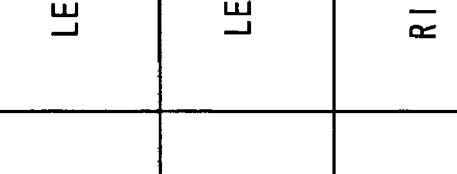 |
|   | −45° | ... | −27° | ... | −18° | ... | | | |
| C | 34° | ... | 22° | ... | 16° | ... | UPPER LEFT | RIGHT | 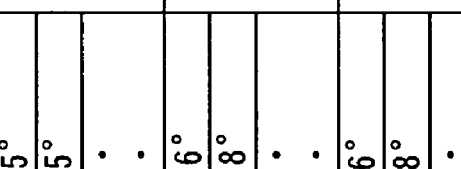 |
|   | 45° | ... | 27° | ... | 18° | ... | | | |
| D | −18° | ... | −22° | ... | −34° | ... | LOWER LEFT | RIGHT | 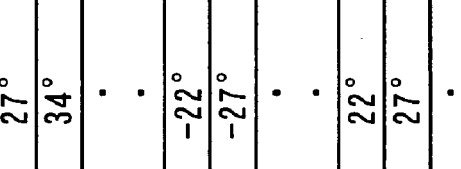 |
|   |      | ... | −27° | ... | −45° | ... | | | |
| E | 18° | ... | 18° | ... | 18° | ... | NONE | NONE | NONE |
|   | 45° | ... | 18° | ... | 45° | ... | | | |

Fig. 10

| AL | IL1 | BL | IL2 | CL | IL3 | DL |
|----|-----|----|-----|----|-----|----|
| 100 |  | 100 |  | 100 |  | 100 |
| 100 | 45° | 100 |  | 100 |  | 100 |
| 100 | 45° (R1) | 100 |  | 100 |  | 100 |
| 0 | 45° | 100 | 27° | 100 |  | 100 |
| 0 | 45° | 100 | 27° | 100 |  | 100 |
| 0 | 45° | 0 | 27° | 100 |  | 100 |
| 0 | 45° | 0 | 27° | 100 |  | 100 |
| 0 | (IN) | 0 | 27° | 100 |  | 100 |
| 0 |  | 0 | 27° | 100 | 18° | 100 |
| 0 |  | 0 | 27° | 0 | 18° | 100 |
| 0 |  | 0 | 27° | 0 | 18° (R2) | 100 |
| 0 |  | 0 |  | 0 | 18° | 100 |
| 0 |  | 0 |  | 0 | 18° | 100 |
| 0 |  | 0 |  | 0 | 18° | 100 |
| 0 |  | 0 |  | 18° | 0 |  |
| 0 |  | 0 |  | 0 |  |  |

Fig. 12

| AL | IL1 | BL | IL2 | CL | IL3 | DL |
|---|---|---|---|---|---|---|
| 100 | 100 | 100 | 100 | 100 | 100 | 100 |
| 100 | 100 | 100 | 100 | 100 | 100 | 100 |
| 100 | 100 | 100 | 100 | 100 | 100 | 100 |
| 0 | 100 | 100 | 100 | 100 | 100 | 100 |
| 0 | 0 | 100 (P3) | 100 | 100 | 100 | 100 |
| 0 (Q3) | 0 | 0 | 100 | 100 | 100 | 100 |
| 0 | 0 | 0 | 100 | 100 | 100 | 100 |
| 0 | 0 | 0 (IN) | 0 | 100 | 100 | 100 |
| 0 | 0 | 0 | 0 | 100 (P4) | 100 | 100 |
| 0 | 0 | 0 | 0 (Q4) | 0 | 100 | 100 |
| 0 | 0 | 0 | 0 | 0 | 100 | 100 |
| 0 | 0 | 0 | 0 | 0 | 100 | 100 |
| 0 | 0 | 0 | 0 | 0 | 0 | 100 |
| 0 | 0 | 0 | 0 | 0 | 0 | 100 |
| 0 | 0 | 0 | 0 | 0 | 0 | 0 |

IMAGE ANGLE DETECTION DEVICE AND SCAN LINE INTERPOLATION DEVICE HAVING THE SAME

TECHNICAL FIELD

The present invention relates to a picture angle detection apparatus that detects the angle of a picture displayed based on a video signal, a scanning lines interpolation apparatus having the same and a picture angle detection method.

BACKGROUND ART

In order to convert interlaced-scanning video signals into progressive-scanning video signals or convert progressive-scanning video signals into enlarged or reduced video signals, an interpolation circuit that carries out scanning lines interpolation is used. In the interpolation circuit, the value of a pixel to be produced by the interpolation (hereinafter referred to as "interpolation pixel") is calculated based on the values of pixels around the interpolation pixel. The angle of a picture having a diagonal edge or a thin diagonal line for example is detected based on the luminance distribution of surrounding pixels and the value of the interpolation pixel is calculated using pixels in the direction with a higher degree of correlation.

Japanese Patent Laid-Open No. 9-37214 discloses a progressive scanning lines interpolation apparatus that can carry out scanning lines interpolation in a picture having a diagonal edge.

The progressive scanning lines interpolation apparatus selects candidate sets of pixels for calculating the differential absolute value between pixel values from sets of original pixels located point-symmetrically around an interpolation pixel in order to convert an interlaced-scanning video signal into a progressive-scanning video signal. The differential absolute values between the values of the selected sets of pixels are each calculated. Then, based on the edge information of these sets of the original pixels, the differential absolute values are corrected, a set of original pixels whose corrected differential absolute value is minimum is detected, and the interpolation pixel is produced based on the detected set of original pixels.

In this way, a picture having a diagonal edge can be subjected to scanning lines interpolation.

The conventional progressive scanning lines interpolation apparatus however cannot determine whether the edge of the picture is a straight line shape or a curved shape such as an arc. Therefore, a picture having a curved edge such as an arc shape cannot be formed into a smooth picture by interpolation.

DISCLOSURE OF THE INVENTION

An object of the invention is to provide a picture angle detection apparatus that can accurately detect the angle and shape of a picture displayed based on a video signal.

Another object of the invention is to provide a scanning lines interpolation apparatus that can carry out interpolation suitable for the angle and shape of a picture displayed based on a video signal.

Further object of the invention is to provide a picture angle detection method that can accurately detect the angle and shape of a picture displayed based on a video signal A picture angle detection apparatus for detecting the angle of a picture related to a pixel to be interpolated in each interpolation scanning line between scanning lines based on an input video signal according to one aspect of the invention comprises a binary pattern generator that binarizes the input video signal in a predetermined detection region including a plurality of scanning lines and the pixel to be interpolated to generate a binary pattern, a reference pattern generator that generates binary pictures having different directions as a plurality of reference patterns, a comparator that compares the binary pattern generated by the binary pattern generator with each of the plurality of reference patterns to detect the angle of the picture related to the pixel to be interpolated based on the comparison result, and a shape detector that detects the shape of the picture based on the combination of the angle of the picture detected by the comparator related to the pixel to be interpolated and angles of the picture detected in upper and lower interpolation scanning lines above and below the pixel.

In the picture angle detection apparatus according to the invention, the binary pattern generator binarizes an input video signal in a predetermined detection region to generate a binary pattern. The reference pattern generator generates binary pictures having different directions as a plurality of reference patterns. The comparator compares the binary pattern with each of the plurality of reference patterns to detect the angle of the picture related to the pixel to be interpolated based on the comparison result. The shape detector detects the shape of the picture based on the combination of the angle of the picture detected by the comparator related to the pixel to be interpolated and angles of the picture detected in the upper and lower interpolation scanning lines.

In this way, two-dimensional patterns are compared, and erroneous detection can be less than the case of using the differential value between two pixels, so that the angle of a diagonal edge of a picture can be detected accurately. Using the two-dimensional reference patterns, the angle to be detected is not limited to angles formed by straight lines connecting pixels in point-symmetry around the interpolation pixel, and angles between these angles can be detected. Consequently, the angles can be detected by smaller steps.

The approach to compare a binary pattern with a plurality of reference patterns for detecting the curved shape of a picture at a time would require an enormous number of reference patterns including at least three scanning lines. This could increase the scale of the circuit and could hardly be practical. In the picture angle detection apparatus according to the invention, local angles of a picture are detected in a small area for each pixel to be interpolated between interpolation scanning lines, and the shape of the picture is detected based on the combination of the detected angles above and below. In this case, the shape of the picture can be detected by partly improving the configuration for detecting the angle of the picture by comparing a binary pattern with a plurality of reference patterns.

Consequently, the detection of the shape of the picture does not delay the process of detecting the angle of the picture, and the angle and shape of the picture can be detected accurately without increasing the scale of the circuit.

Provided that the angle of the picture detected by the comparator related to the pixel to be interpolated is between the angle of the picture detected in the upper interpolation scanning line and the angle of the picture detected in the lower interpolation scanning line, and the absolute value of the angle of the picture detected in the upper interpolation scanning line is larger than the absolute value of the angle of the picture detected in the lower interpolation scanning line, the shape detector may output a shape detection signal indicating that the shape of the picture is convex toward the lower right, when the angle of the picture detected related to the pixel to be interpolated, and the angle of the picture detected in the upper interpolation scanning line and the angle of the picture detected in the lower interpolation scanning line are positive values, while the shape detector may output a shape detection signal indicating that the shape of the picture is convex toward the lower left, when the angle of the picture detected related to the pixel to be interpolated, and the angle of the picture detected in the upper interpolation scanning line and the angle of the picture detected in the lower interpolation scanning line are negative values. Meanwhile, provided that the angle of the picture detected by the comparator related to the pixel to be interpolated is between the angle of the picture detected in the upper interpolation scanning line and the angle of the picture detected in the lower interpolation scanning line, and the absolute value of the angle of the picture detected in the upper interpolation scanning line is smaller than the absolute value of the angle of the picture detected in the lower interpolation scanning line, the shape detector may output a shape detection signal indicating that the shape of the picture is convex toward the lower left, when the angle of the picture detected by the comparator related to the pixel to be interpolated, and the angle of the picture detected in the upper interpolation scanning line and the angle of the picture detected in the lower interpolation scanning line are positive values, while the shape detector may output a shape detection signal indicating that the shape of the picture is convex toward the upper right, when the angle of the picture detected related to the pixel to be interpolated, and the angle of the picture detected in the upper interpolation scanning line and the angle of the picture detected in the lower interpolation scanning line are negative values.

In this way, the direction in which the picture has a convex shape can be detected depending on the combination of the angle of the picture detected related to the pixel to be interpolated and angles detected in the upper and lower interpolation scanning lines.

When the shape detector detects that the shape of the picture is an arc, the detector may output a shape detection signal indicating the direction of the inside of the arc.

In this way, the direction of the arc in the picture having the arc shape can be determined based on the shape detection signal indicating the inside of the arc.

The binary pattern generator may include a threshold value calculation device that calculates a threshold value for binarization based on the luminance of a video signal in the detection region, and a binarizer that binarizes the input video signal using the threshold value calculated by the threshold value calculation device to generate the binary pattern.

In this way, the threshold value for binarization is calculated based on the luminance of the video signal in the detection region, and therefore the binary pattern can be generated without an externally set threshold value and irrespective of the luminance level of the video signal.

The picture angle detection apparatus may further comprise a determining device that determines whether or not the luminance distribution in the horizontal direction of scanning lines is in the form of a monotonous increase or decrease in the video signals in the detection region, and the comparator may not compare the binary pattern with each of the plurality of reference patterns when the luminance distribution is neither in the form of a monotonous increase nor a monotonous decrease.

When the luminance distribution in the horizontal direction of the scanning lines is not in the form of a monotonous increase or decrease in the video signal in the detection region, the binary pattern is not compared to each of the plurality of reference patterns, and the angle of the picture is not detected. In this way, erroneous detection caused by noise can be reduced.

The picture angle detection apparatus may further comprise a contrast detector that detects a contrast in the video signal in the detection region, and the comparator may not compare the binary pattern with each of the plurality of reference patterns when the contrast detected by the contrast detector is smaller than a predetermined value.

When the contrast in the video signal is low, the effect of interpolation processing with diagonally located pixels is small. Therefore, when the contrast in the video signal in the detection region is smaller than a predetermined value, the binary pattern is not compared with each of the plurality of reference patterns and the angle of the picture is not detected. In this way, the interpolation processing with diagonally located pixels that causes noises may be carried out only when there can be a great effect.

The plurality of reference patterns each include a first pixel row arranged in a scanning line above the pixel to be interpolated and a second pixel row arranged in a scanning line below the pixel to be interpolated, the first pixel row has one transition point from a first pixel value to a second pixel value, the second pixel row has one transition point from a first pixel value to a second pixel value, and the transition direction from the first pixel value to the second pixel value in the first pixel row and the transition direction from the first pixel value to the second pixel value in the second pixel row may be the same.

In this reference pattern, the pixel row in the upper scanning line and the pixel row in the lower scanning line both have a luminance change and a luminance gradient in the same direction. The reference pattern corresponds to a picture with a diagonal edge. Consequently, when the binary pattern is matched with a reference pattern, the angle of the diagonal edge can surely be specified.

A scanning lines interpolation apparatus according to another aspect of the invention comprises a picture angle detection apparatus that detects the angle and shape of a picture related to a pixel to be interpolated based on an input video signal, and an interpolation circuit that selects pixels to be used for interpolation based on the angle and shape detected by the picture angle detection apparatus, and calculates the value of the pixel to be interpolated using the selected pixels to generate an interpolation scanning line. The picture angle detection apparatus includes a binary pattern generator that binarizes the input video signal in a predetermined detection region including a plurality of scanning lines and a pixel to be interpolated in each scanning line to generate a binary pattern, a reference pattern generator that generates binary pictures having different directions as a plurality of reference patterns, a comparator that compares the binary pattern generated by the binary pattern generator with each of the plurality of reference patterns generated by the reference pattern generator to detect the angle of the picture related to the pixel to be interpolated based on the result of comparison, and a shape detector that detects the shape of the picture based on the combination of the angle of the picture detected by the comparator related to the pixel to be interpolated and the angles of the picture detected in upper and lower interpolation scanning lines.

In the scanning lines interpolation apparatus according to the invention, the angle detection apparatus surely detects the angle and shape of the picture related to the pixel to be interpolated based on an input video signal, and pixels to be used for interpolation are selected based on the angle and shape detected by the picture angle detection apparatus. Using the selected pixels, the interpolation circuit calculates the value of the pixel to be interpolated to generate an interpolation scanning line.

In this way, the pixels to be used for interpolation are selected depending on the shape of the picture, and therefore not only straight line shapes but also curved, diagonal edges may smoothly be interpolated.

Consequently, smooth interpolation suitable for the angle and shape of the picture displayed based on the video signal can be carried out.

When the shape detector detects that the shape of the picture is an arc, the detector may output a shape detection signal indicating the direction of the inside of the arc, and the interpolation circuit may select pixels to be used for interpolation from the inside of the arc based on the shape detection signal output from the shape detector and calculate the value of the pixel to be interpolated using the selected pixels to generate an interpolation scanning line.

In this way, the pixels to be used for interpolation are selected from the inside of the arc based on the shape detection signal indicating the direction of the inside of the arc, and the value of the pixel to be interpolated is calculated using the selected pixels. Therefore, smooth interpolation along the shape of the arc can be carried out.

When the shape detector detects that the shape of the picture is an arc, the detector may output a shape detection signal indicating the direction of the inside of the arc. The interpolation circuit may select positions shifted in the direction of the inside of the arc by 0.5 pixel from positions in the upper and lower scanning lines in the direction of the angle of the picture detected for the pixel to be interpolated and calculate the value of the pixel to be interpolated using the values of the pixels in the selected positions in order to generate an interpolation scanning line.

In this way, the pixels to be used for interpolation are selected from specified pixels within the inside of the arc based on the shape detection signal indicating the inside of the arc. The value of the pixel to be interpolated is then calculated using the selected pixels. Therefore, smooth interpolation along the shape of the arc can be carried out.

Furthermore, the pixels to be used for interpolation can be selected depending on the shape of the arc, and therefore not only straight line shapes but also diagonal edges of arc shapes may smoothly be interpolated.

A picture angle detection method for detecting the angle of a picture related to a pixel to be interpolated in each interpolation scanning line between scanning lines based on an input video signal according to further aspect of the invention comprises the steps of binarizing the input video signal in a predetermined detection region including a plurality of scanning lines and the pixel to be interpolated to generate a binary pattern, generating binary pictures having different directions as a plurality of reference patterns, comparing the generated binary pattern with each of the generated plurality of reference patterns to detect the angle of the picture related to the pixel to be interpolated based on the comparison result, and detecting the shape of the picture based on the combination of the detected angle of the picture related to the pixel to be interpolated and angles of the picture detected in upper and lower interpolation scanning lines above and below the pixel.

In the picture angle detection method according to the invention, an input video signal in a predetermined detection region is binarized to generate a binary pattern. Binary pictures having different directions are generated as a plurality of reference patterns. The binary pattern is compared with each of the plurality of reference patterns to detect the angle of the picture related to the pixel to be interpolated based on the comparison result. The shape of the picture is detected based on the combination of the angle of the detected picture related to the pixel to be interpolated and angles of the picture detected in the upper and lower interpolation scanning lines.

In this way, two-dimensional patterns are compared, and erroneous detection can be less than the case of using the differential value between two pixels, so that the angle of a diagonal edge of a picture can be detected accurately. Using the two-dimensional reference patterns, the angle to be detected is not limited to angles formed by straight lines connecting pixels in point-symmetry around the interpolation pixel, and angles between these angles can be detected. Consequently, the angles can be detected by smaller steps.

Local angles of a picture are detected in a small area for each pixel to be interpolated between interpolation scanning lines, and the shape of the picture is detected based on the combination of the detected angles above and below. In this case, the shape of the picture can be detected by partly improving the configuration for detecting the angle of the picture by comparing a binary pattern with a plurality of reference patterns.

Consequently, the detection of the shape of the picture does not delay the process of detecting the angle of the picture, and the angle and shape of the picture can be detected accurately without increasing the scale of the circuit.

BRIEF DESCRIPTION OF THE DRAWINGS

FIGS. 3 to 6 are schematic diagrams each showing an example of reference patterns generated by the reference pattern generator shown in FIG. 1;

FIG. 7 is a table for use in illustration of processing by the arc shape detector in FIG. 1;

FIG. 10 is a schematic diagram showing an example of the angles of a picture detected by the picture angle detection apparatus shown in FIG. 1;

FIG. 12 is a schematic diagram showing an example of interpolation of pixels using the angle information of a picture detected by the picture angle detection apparatus shown in FIG. 1.

BEST MODE FOR CARRYING OUT THE INVENTION

Figure 1:
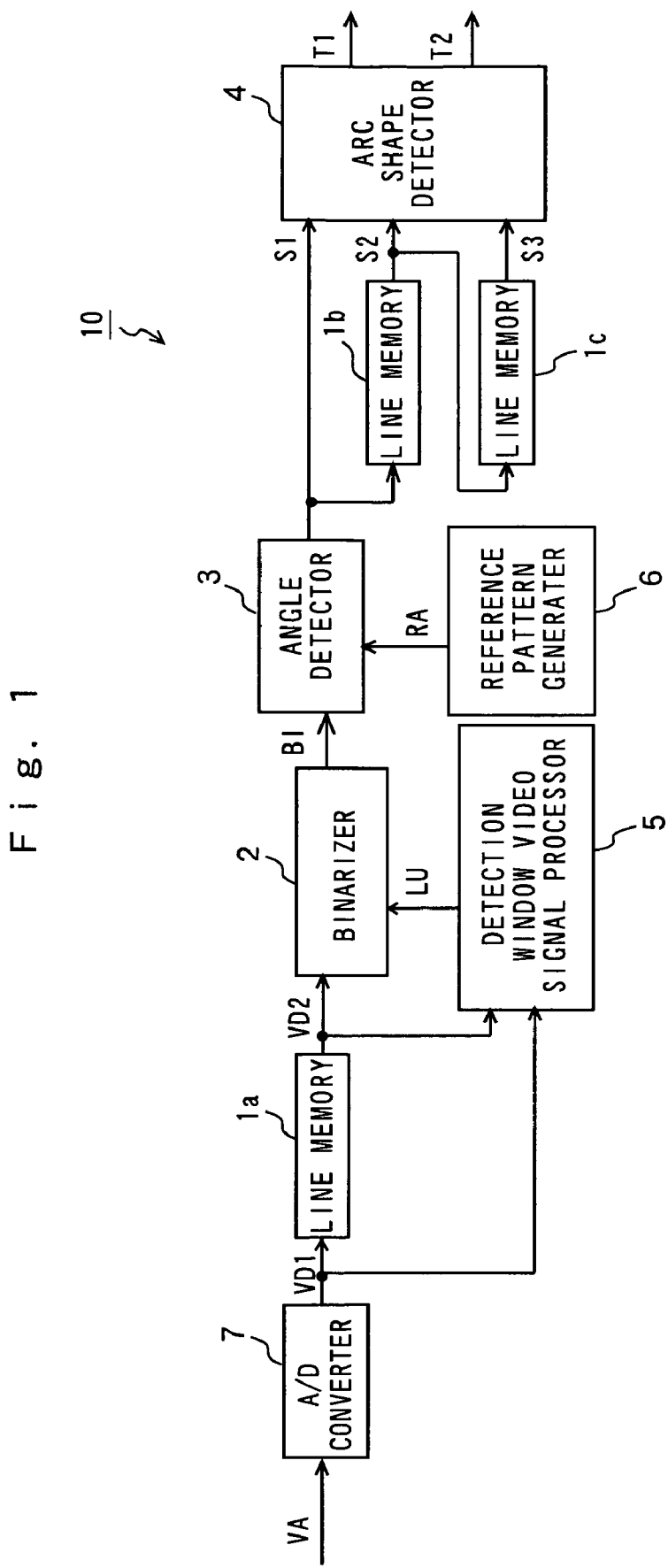
FIG. 1 is a block diagram showing the configuration of a picture angle detection apparatus according to an embodiment of the invention.

FIG. 1 is a block diagram of the configuration of a picture angle detection apparatus according to an embodiment of the invention.

The picture angle detection apparatus 10 shown in FIG. 1 includes line memories 1a, 1b, and 1c, a binarizer 2, an angle detector 3, an arc shape detector 4, a detection window video signal processor 5, a reference pattern generator 6, and an A/D (analog/digital) converter 7.

The A/D converter 7 converts an analog video signal VA into a digital video signal VD1 for output. The video signal VD1 output from the A/D converter 7 is input into the line memory 1a and the binarizer 2 and the detection window video signal processor 5. The line memory 1a delays the video signal VD1 output from the A/D converter 7 by one scanning line for output. The video signal VD2 thus output from the line memory 1a is provided to the binarizer 2 and the detection window video signal processor 5.

In this example, the video signals VD1 and VD2 have 256 gray scale luminance levels. More specifically, the minimum luminance value for the video signals VD1 and VD2 is "0" and the maximum value is "255".

The binarizer 2 binarizes the video signal VD1 output from the A/D converter 7 and the video signal VD2 output from the line memory 1a using an average luminance value LU applied from the detection window video signal processor 5 that will be described and outputs a binary pattern BI of "1" and "0". The binary pattern BI has a size equal to that of the detection window.

Here, the detection window is for example a rectangular region including 7×2 pixels, seven pixels of which are from the video signal VD1 and the remaining seven pixels are from the video signal VD2, or a rectangular region including 15×2 pixels, 15 pixels of which are from the video signal VD1 and the remaining 15 pixels are from the video signal VD2. Note that in the following description, the size of the detection window is 9×2 pixels. In this case, the size of the binary pattern BI is also 9×2 pixels. The size of the detection window is not limited to these, which can be set arbitrarily within the scope of the invention.

The detection window video signal processor 5 sets a detection window for the input video signal VD1 and the video signal VD2 output from the line memory 1a, calculates the average luminance value of the video signals VD1 and VD2 in the detection window, and provides the resulting average luminance value LU to the binarizer 2 as a threshold value for binarization.

Note that according to the embodiment, the average luminance value of all the pixels in the detection window is used as the threshold for binarization. However, the average value between the maximum and minimum values of the pixels in the detection window or the middle number in the sequence of luminance values in the order of magnitude may be used as the threshold value. Alternatively, the average luminance value of a plurality of pixels whose values are close to the middle number in the sequence of luminance values in the order of magnitude may be used as the threshold value for binarization.

The detection window video signal processor 5 determines whether or not the horizontal luminance distribution of the video signals VD1 and VD2 in the detection window is in the form of a monotonous increase or decrease. When the distribution is not in the form of a monotonous increase or decrease, the minimum value "0" or the maximum value "255" may be provided to the binarizer 2 as a threshold value. Then, the binarizer 2 outputs a binary pattern BI of all "1" or "0". In this case, the differential value between two adjacent pixels in the video signals VD1 and VD2 may be calculated sequentially, and if the differential values have the same sign, it could be determined that the distribution is in the form of a monotonous increase or decrease.

The detection window video signal processor 5 calculates the difference between the maximum and minimum luminance values of the video signals VD1 and VD2 in the detection window as a contrast. Then, when the calculated contrast is lower than a predetermined value, the minimum value "0" or the maximum value "255" is provided to the binarizer 2. In this way, the binarizer 2 outputs a binary pattern BI of all "1" or "0".

The reference pattern generator 6 generates a plurality of reference patterns RA of "1" and "0" and applies the patterns to the angle detector 3. The reference patterns RA each have a size equal to that of the detection window.

The angle detector 3 compares the binary pattern BI provided from the binarizer 2 with each of the plurality of reference patterns RA provided from the reference pattern generator 6 and outputs the angle of a matched one of the reference patterns RA as angle information S1. The angle will later be described. Now, the comparison operation between the binary pattern BI and the reference patterns RA will be referred to as "pattern matching".

As described above, if the luminance distributions of the video signals VD1 and VD2 in the detection window are both not in the form of a monotonous increase or decrease, a binary pattern BI of all "1" or "0" may be output from the binarizer 2. In this case, the angle information S1 is not output from the angle detector 3.

When the contrast in the video signals VD1 and VD2 in the detection window is lower than the predetermined value, a binary pattern BI of all "1" or "0" is output from the binarizer 2, and therefore the angle information S1 is not output from the angle detector 3.

When the contrast in the video signals VD1 and VD2 is low, the effect of interpolation using diagonally located pixels is small. In interpolation using diagonally located pixels, noises could be caused unless angles are not accurately detected. Therefore, when the effect is low, the angle information S1 is not output so that the interpolation using diagonally located pixels is not carried out.

The line memory 1b outputs angle information S2 delayed by one scanning line from the angle information S1 output from the angle detector 3 to the arc shape detector 4 and the line memory 1c. The line memory 1c applies angle information S3 delayed by one scanning line from the angle information S2 output from the line memory 1b to the arc shape detector 4.

Here, a scanning line including an interpolation pixel will be referred to as "interpolation scanning line". The arc shape detector 4 outputs picture edge angle information T1 based on the combination of the angle information S3 of an interpolation scanning line one line above the object interpolation scanning line, the angle information S1 of an interpolation scanning line one line below the object interpolation scanning line, and the angle information S2 of the object interpolation scanning line. The arc shape detector 4 also recognizes the arc shape and outputs arc shape information T2. Note that the angle detection and the arc shape recognition will be detailed later.

Figure 2:
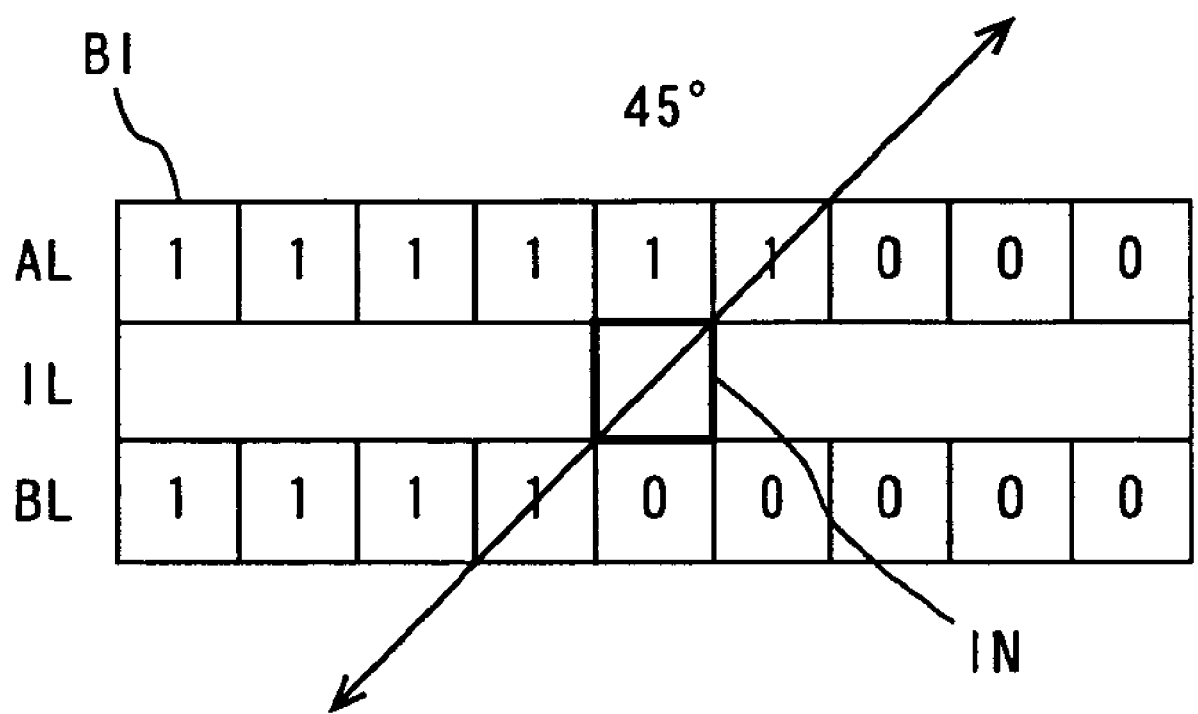
FIG. 2 is a schematic diagram showing an example of a binary pattern output from a binarizer in the apparatus.

FIG. 2 is a schematic diagram showing an example of the binary pattern BI output from the binarizer 2 shown in FIG. 1.

In FIG. 2, IN represents an interpolation pixel and IL represents an interpolation scanning line. Also in the figure, AL represents a scanning line one line above the interpolation scanning line IL, while BL represents a scanning line one line below the interpolation scanning line IL.

In the example in FIG. 2, the low luminance part (dark part) is indicated by "0" and the high luminance part (bright part) is indicated by "1". In the binary pattern BI, the angle of the edge of a picture is 45°. Here, the horizontal angle is 0 and the angle in the upper right diagonal direction is positive.

FIGS. 3, 4, 5, and 6 are schematic diagrams each showing an example of reference patterns generated by the reference pattern generator 6 in FIG. 1. The shadowed pixels are pixels in the upper and lower scanning lines that are used for calculating values of interpolation pixels indicated by bold squares.

Figure 3:
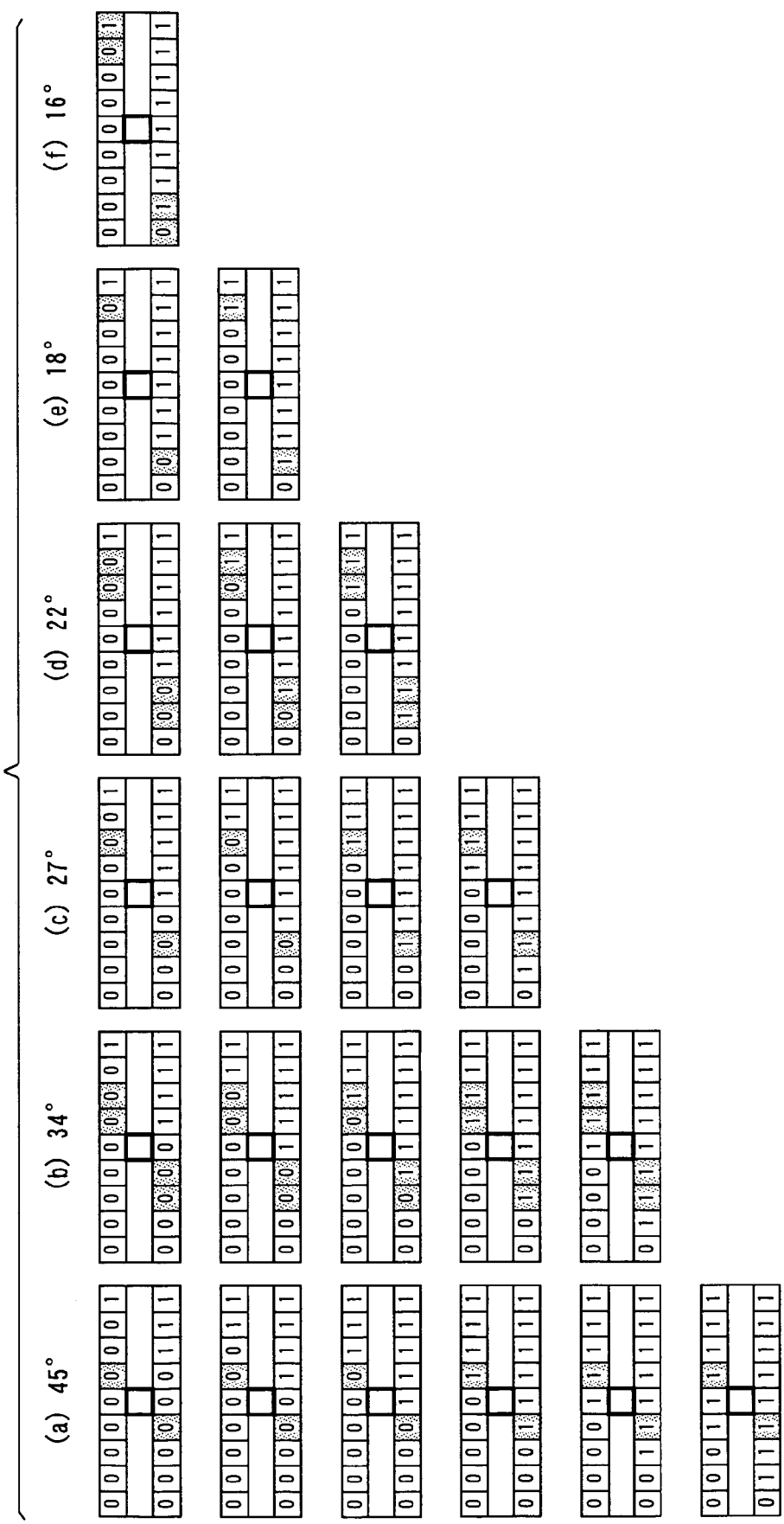
Figure 4:
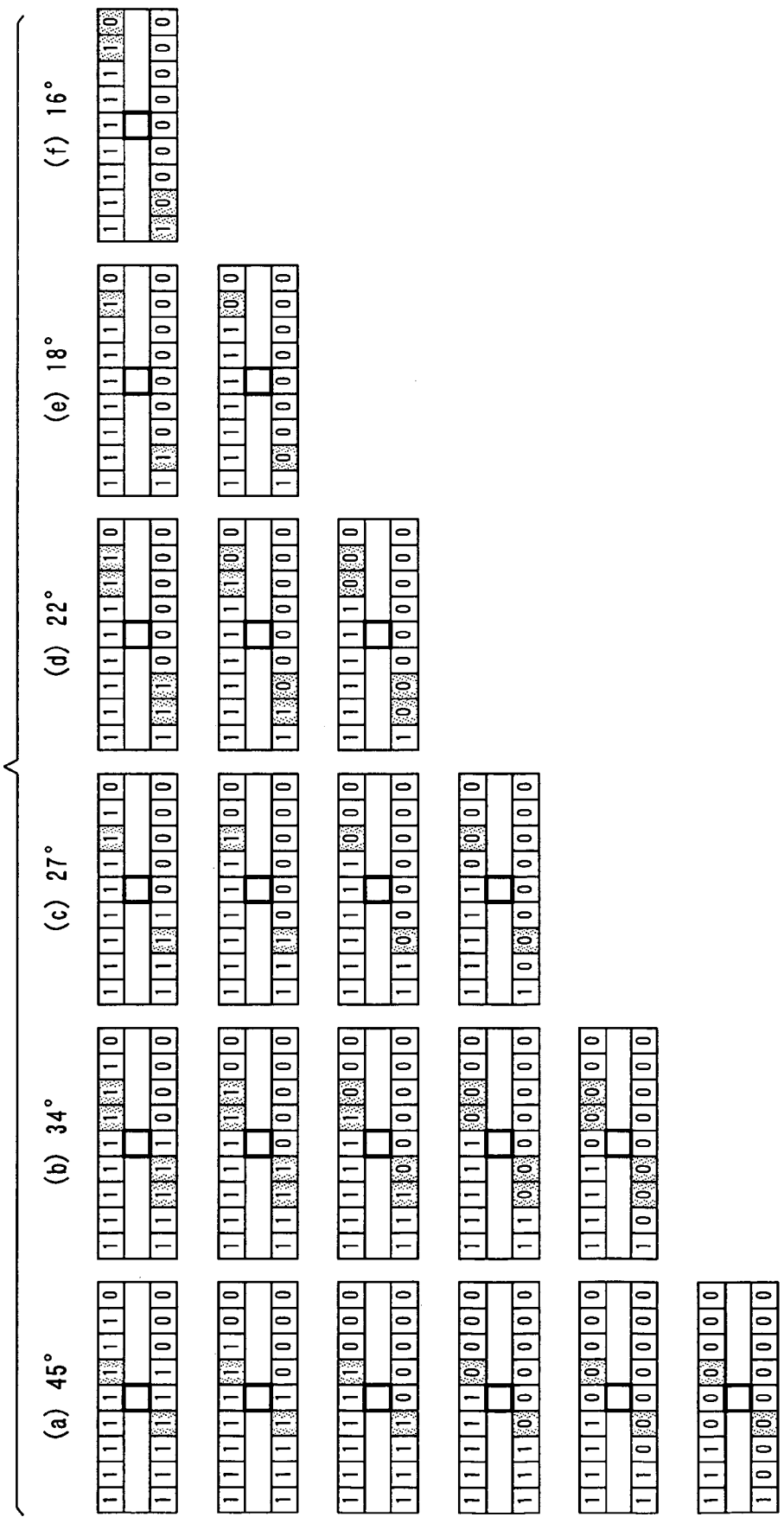

In FIGS. 3, (a), (b), (c), (d), (e), and (f) are reference patterns for 45°, 34°, 27°, 22°, 18°, and 16°, respectively. In the example in FIG. 3, the upper left part is a dark part and the lower right part is a bright part. In FIGS. 4, (a), (b), (c), (d), (e), and (f) are reference patterns for 45°, 34°, 27°, 22°, 18°, and 16°, respectively. In the example in FIG. 4, the upper left part is a bright part and the lower right part is a dark part.

Figure 5:
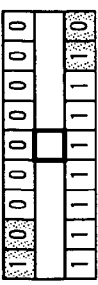
Figure 6:
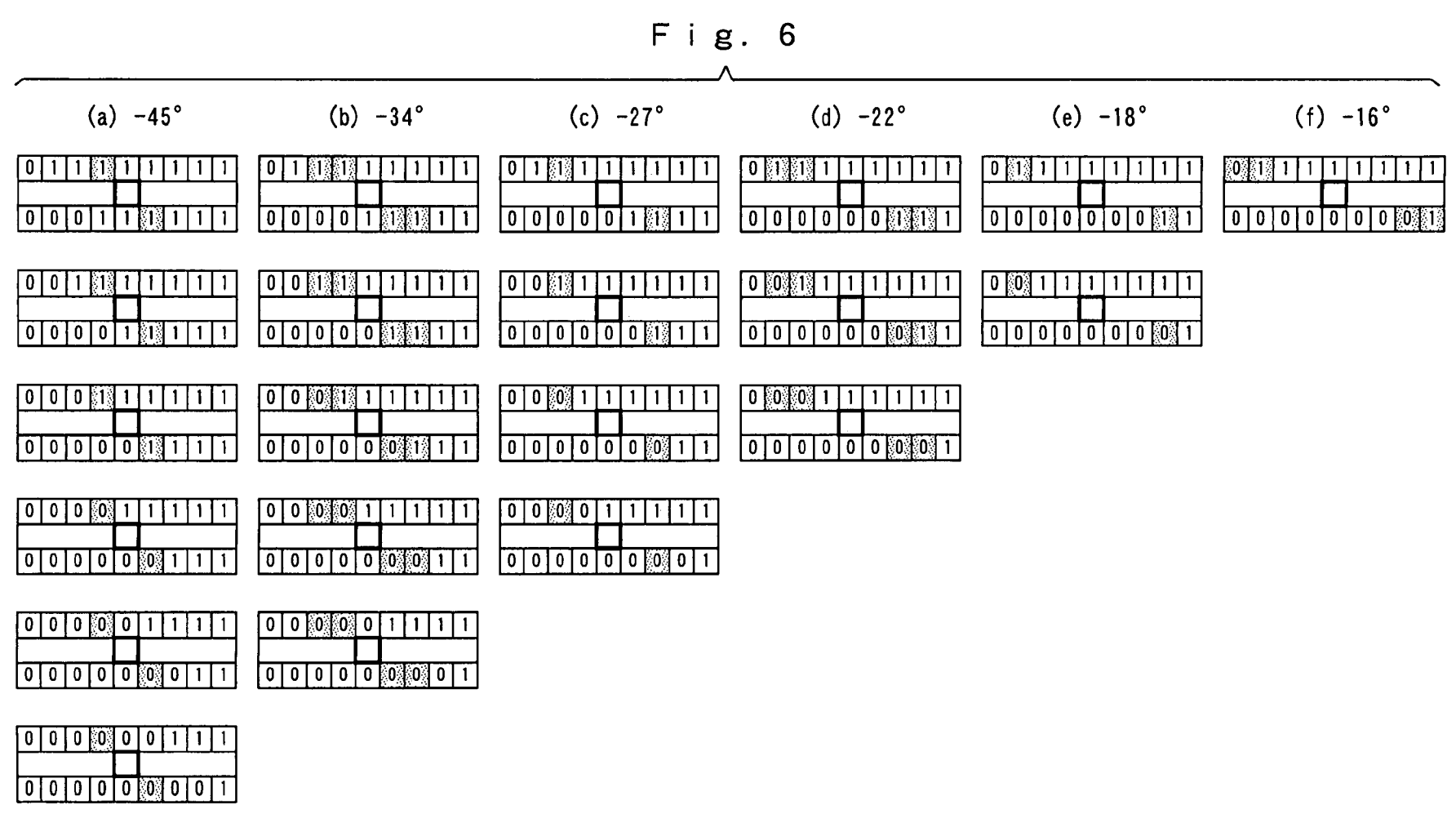

In FIGS. 5, (a), (b), (c), (d), (e), and (f) are reference patterns for −45°, −34°, −27°, −22°, −18°, and −16°, respectively. In the example in FIG. 5, the upper right part is a dark part and the lower left part is a bright part. In FIGS. 6, (a), (b), (c), (d), (e), and (f) are reference patterns for −45°, −34°, −27°, −22°, −18°, and −16°, respectively. In the example in FIG. 6, the upper right part is a bright part and the lower left part is a dark part.

The reference patterns shown in FIGS. 3 to 6 are compared with the binary pattern BI output from the binarizer 2 at the angle detector 3, and the angle detector 3 outputs the angle information S1 of the reference pattern matched with the pattern BI.

In addition, as shown in FIGS. 3 to 6, in the reference patterns based on two-dimensional luminance distribution, not only angles between straight lines connecting pixels located in point-symmetrical positions around the interpolation pixel but also angles between these angles may be set. For example, angles 34° and 22° between 45°, 27°, and 18° can be set.

The binary pattern BI in FIG. 2 for example can be matched with one of the six reference patterns at (a) in FIG. 4. In this case, the angle detector 3 in FIG. 1 outputs 45° indicated by the reference pattern at (a) in FIG. 4 as the angle information S1. Note that the reference patterns RA generated by the reference pattern generator 6 in FIG. 1 may have an arbitrary size other than those of the examples shown in FIG. 6.

FIG. 7 is a table for use in illustration of processing by the arc shape detector 4 in FIG. 1. The table in FIG. 7 includes detected angles for interpolation pixels, and examples of arc shapes recognized based on combinations of detected angles in a lower interpolation scanning line and an upper interpolation scanning line.

More specifically, the arc shapes are divided into five cases of combinations A, B, C, D, and E.

In Case A in FIG. 7, the edge of the arc (arc edge) has a convex shape directed to the "lower right", and the inside of the arc is directed to the "left". In this case, the absolute value of the detected angle of the interpolation pixel is the intermediate value between the absolute values of the detected angle in the lower and upper interpolation scanning lines. The absolute value of the detected angle in the upper interpolation scanning line is larger than the absolute value of the detected angle in the lower interpolation scanning line and all the detected angles are positive values.

The arc shape detector 4 outputs the detected angle of the interpolation pixel as angle information T1. When an arc shape is recognized, the direction of the inside of the arc shape is output as arc shape information T2.

FIG. 7 shows schematic arc shapes and the directions of the inside of the arc shapes in the right most column by way of illustration. The sets of thin connected arrows are each recognized as an arc, and the direction of each of the thin arrows indicates an angle detected along the arc, and thick arrows indicate the insides of the arcs.

Similarly to Case A in FIG. 7, in the combination cases B, C, and D, the direction of the convex shape of the arc edge and the direction of the inside of the arc shape are shown.

In Case B in FIG. 7, the direction of the convex shape of the arc edge is the "upper right" and the direction of the inside is the "left". In this case, the absolute value of the detected angles of the interpolation pixel is the intermediate value between the absolute values of the detected angles in the lower and upper interpolation scanning lines. The absolute value of the detected angle in the upper interpolation scanning line is smaller than the absolute value of the detected angle in the lower interpolation scanning line and all the detected angles are negative values.

In the combination in Case C in FIG. 7, the direction of the convex shape of the arc edge is the "upper left" and the direction of the inside of the arc shape is the "right". In this case, the absolute value of the interpolation pixel is the intermediate value between the absolute values of the detected angles in the lower and upper interpolation scanning lines. The absolute value of the detected angle in the upper interpolation scanning line is smaller than the absolute value of the detected angle in the lower interpolation scanning line and all the detected angles are positive values.

In the combination in Case D in FIG. 7, the direction of the convex shape of the arc edge is the "lower left" and the direction of the inside of the arc shape is the "right". In this case, the absolute value of the detected angle of the interpolation pixel is the intermediate value between the absolute values of the detected angle in the lower and upper interpolation scanning lines. The absolute value of the detected angles in the upper interpolation scanning line is smaller than the absolute value of the detected angle in the lower interpolation scanning line and all the detected angles are negative values.

In Case E in FIG. 7, the combination of detected angles cannot be recognized as that of an arc shape. More specifically, any combinations not belonging to the combinations in Cases A, B, C, and D all belong to Case E in FIG. 7.

Note that the intermediate value is defined as any value between two values X and Y, and larger than X and smaller than Y when X<Y.

The reference position for a detected angle in the upper interpolation scanning line corresponds to a single point in the direction determined based on the detected angle of the interpolation pixel in the upper interpolation scanning line relative to the interpolation pixel. The reference position for the detected angle in the lower interpolation scanning line corresponds to a single point in the direction determined based on the detected angle of the interpolation pixel in the upper interpolation scanning line relative to the interpolation pixel.

The reference position for a detected angle in the upper interpolation scanning line may be a horizontal region (of a plurality of pixels) having a predetermined width including a point in the direction determined based on the detected angle of the interpolation pixel in the upper interpolation scanning line relative to the interpolation pixel. The reference position for a detected angle in the lower interpolation scanning line may be a horizontal region (of a plurality of pixels) having a predetermined width including a point in the direction determined based on the detected angle of the interpolation pixel in the lower interpolation scanning line relative to the interpolation pixel.

Note that the combinations of the detected angle of the interpolation pixel, and the detected angles in the upper and lower interpolation scanning lines as shown in FIG. 7 are only by way of illustration, and by no means intended as being restrictive. Combinations other than those shown may be employed.

In the picture angle detection apparatus 10 according to the embodiment, the luminance distribution of the video signals VD1 and VD2 in the detection widow is converted into the binary pattern BI. Then, the binary pattern BI is compared for pattern matching with a plurality of preset reference patterns RA, so that the angle of a diagonal edge in a picture can be detected with a small scale circuit configuration.

In this way, the average luminance value in the detection window is used as the threshold value for binarization, and therefore a binary pattern BI including both "0" and "1" can always be produced regardless of the luminance level of the picture and without an externally set binary threshold value.

Since the pattern matching is carried out based on the two-dimensional luminance distribution, erroneous detection can be less than the case of using the differential value between two pixels, so that the angle of a diagonal edge of a picture can be detected accurately.

Using the reference patterns RA based on the two-dimensional luminance distribution, the angle to be detected is not limited to an angle formed by straight lines connecting pixels in point-symmetry around the interpolation pixel, and angles between these angles can be detected. Consequently, the angles can be detected at smaller intervals using the line memory 1a with a smaller capacity.

Since an arc shape can be recognized based on the combination of the detected angle of the interpolation pixel, and the detected angles of the upper and lower interpolation scanning lines, reference patterns that require three or more scanning lines are not necessary. Consequently, the angle of a picture can be detected and the arc shape can be recognized without increasing the circuit scale of the picture angle detection apparatus 10 or the calculation range by the apparatus.

Figure 8:
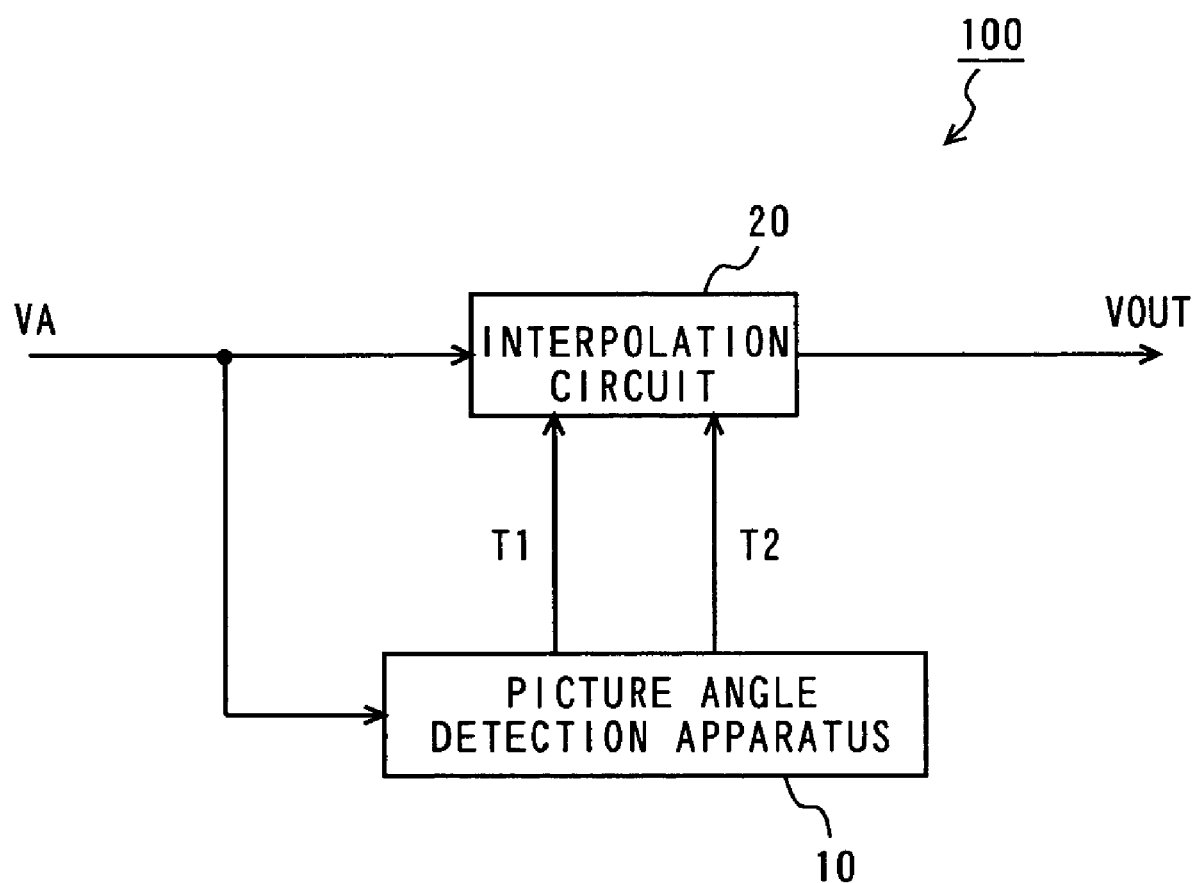
FIG. 8 is a block diagram showing the configuration of a scanning lines interpolation apparatus including the picture angles detection apparatus shown in FIG. 1.

FIG. 8 is a block diagram showing the configuration of a scanning lines interpolation apparatus including the picture angle detection apparatus shown in FIG. 1.

In FIG. 8, the scanning lines interpolation apparatus 100 includes the picture angle detection apparatus 10 and an interpolation circuit 20. A video signal VA is input to the picture angle detection apparatus 10 and the interpolation circuit 20.

The picture angle detection apparatus 10 has the same configuration as that of the picture angle detection apparatus 10 shown in FIG. 1. The picture angle detection apparatus 10 detects the angle of a diagonal edge or an arc shape of a picture based on the video signal VA, and outputs angle information T1 and arc shape information T2. The interpolation circuit 20 selects pixels from the upper and lower scanning lines in a diagonal direction relative to the interpolation pixel based on the angle information T1 and the arc shape information T2, calculates the luminance value of the interpolation pixel using the luminance values of the selected pixels, and outputs an interpolation video signal VOUT.

In the scanning lines interpolation apparatus 100 shown in FIG. 8, the angles of a picture whose edge in a diagonal direction includes not only a straight line shape but also an arc shape can accurately be detected, and the arc shape can be recognized. Therefore, for the picture whose edge in a diagonal direction includes not only a straight line shape but also an arc shape, suitable pixels in the diagonal direction can be selected to carry out smooth interpolation.

Figure 9:
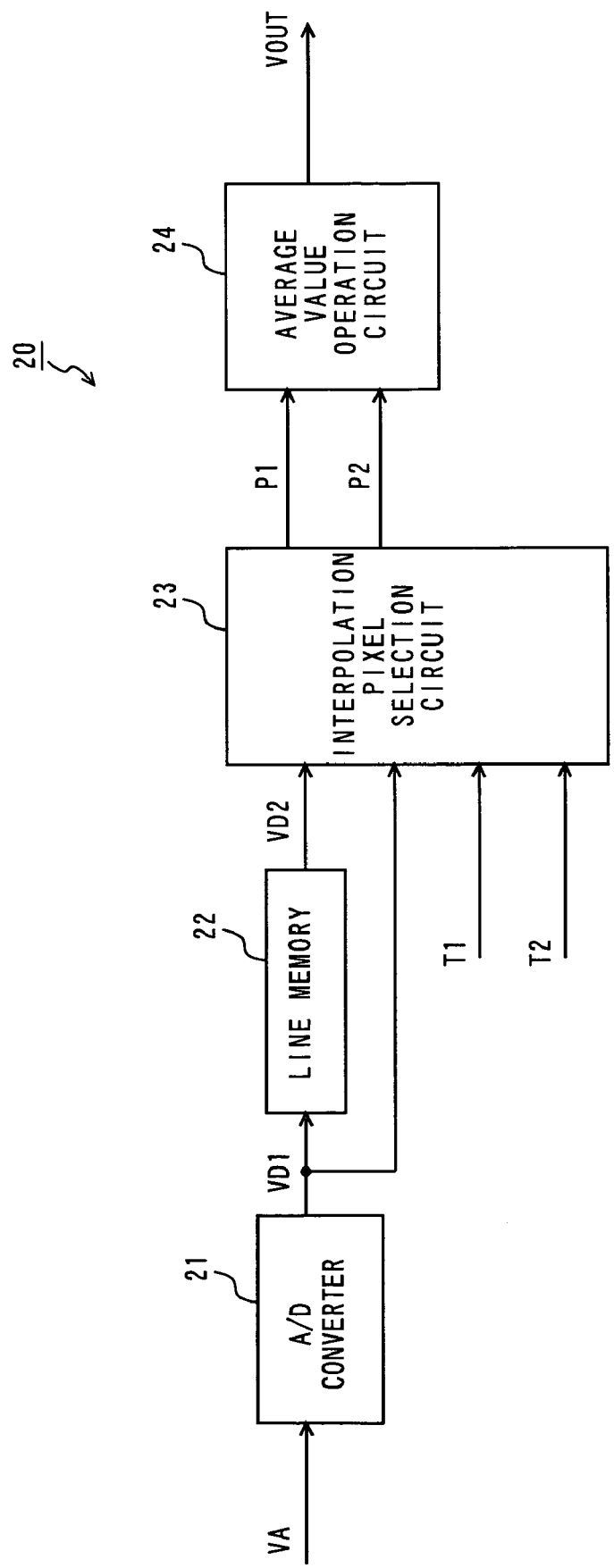
FIG. 9 is a block diagram showing the configuration of an interpolation circuit in the scanning lines interpolation apparatus shown in FIG. 8.

FIG. 9 is a block diagram of the configuration of the interpolation circuit 20 in the scanning lines interpolation apparatus 100 shown in FIG. 8.

The interpolation circuit 20 in FIG. 9 includes an A/D (analog/digital) converter 21, a line memory 22, an interpolation pixel selection circuit 23, and an average value operation circuit 24.

The A/D converter 21 converts an analog video signal VA into a digital video signal VD1 for output. The video signal VD1 output from the A/D converter 21 is input into the line memory 22 and the interpolation pixel selection circuit 23. The line memory 22 delays the video signal VD1 output from the A/D converter 21 by one scanning line for output. The video signal VD2 thus output from the line memory 22 is provided to the interpolation pixel selection circuit 23.

Using the provided video signals VD1 and VD2, and the angle information T1 and the arc shape information T2 in the picture angle detection apparatus 10, the interpolation pixel selection circuit 23 selects an interpolation reference pixel P1 from the upper scanning line for output and an interpolation reference pixel P2 from the lower scanning line for output to the average value operation circuit 24.

The average value operation circuit 24 calculates and outputs the luminance value of the interpolation pixel based on the interpolation reference pixels P1 and P2.

The interpolation pixel selection circuit 23 selects these interpolation reference pixels so that edges in a picture can be smoothed by interpolation. The interpolation pixel selection circuit 23 performs selectively the operation for the case when the picture has a straight line shaped edge and the operation for the case when the picture has an arc shaped edge. When the picture has a straight line shaped edge, the interpolation pixel selection circuit 23 selects pixels in the shadowed part in FIGS. 3 to 6 from the upper and lower scanning lines as interpolation reference pixels. The center positions of the interpolation reference pixels are interpolation reference positions. Meanwhile, when the picture has an arc shaped edge, the interpolation pixel selection circuit 23 specifies positions in the direction relative to the interpolation pixel indicated by the angle information T1, and selects positions shifted horizontally within the inside of the arc shape as the interpolation reference positions based on the arc shape information T2.

With reference to FIG. 7, for example, when the arc shape in Case A is detected, the direction of the inside of the arc is the left as denoted by the thick arrow, and therefore the interpolation pixel selection circuit 23 specifies positions in the direction indicated by the angle information T1 in the upper and lower scanning lines relative to the interpolation pixel, and selects the interpolation reference positions from positions shifted to the left from the specified positions.

It has been confirmed through experiments that for a picture with an arc shape, the arc shape is most smoothly formed by interpolation when the positions 0.5 pixel shifted from the interpolation reference positions selected for the picture having a straight line shaped edge are selected as the interpolation reference positions.

The average value operation circuit 24 calculates the average luminance value of the pixels including the interpolation reference positions to determine the luminance value of the interpolation pixel. Although not shown, the average value operation circuit 24 includes a correlation operation circuit and may carry out interpolation operation corresponding to the correlation degree, i.e., the difference between the pixels including the interpolation reference positions. In this way, if the angle or arc shape is detected erroneously for some reason, a noise caused by interpolation can be reduced.

Figure 11:
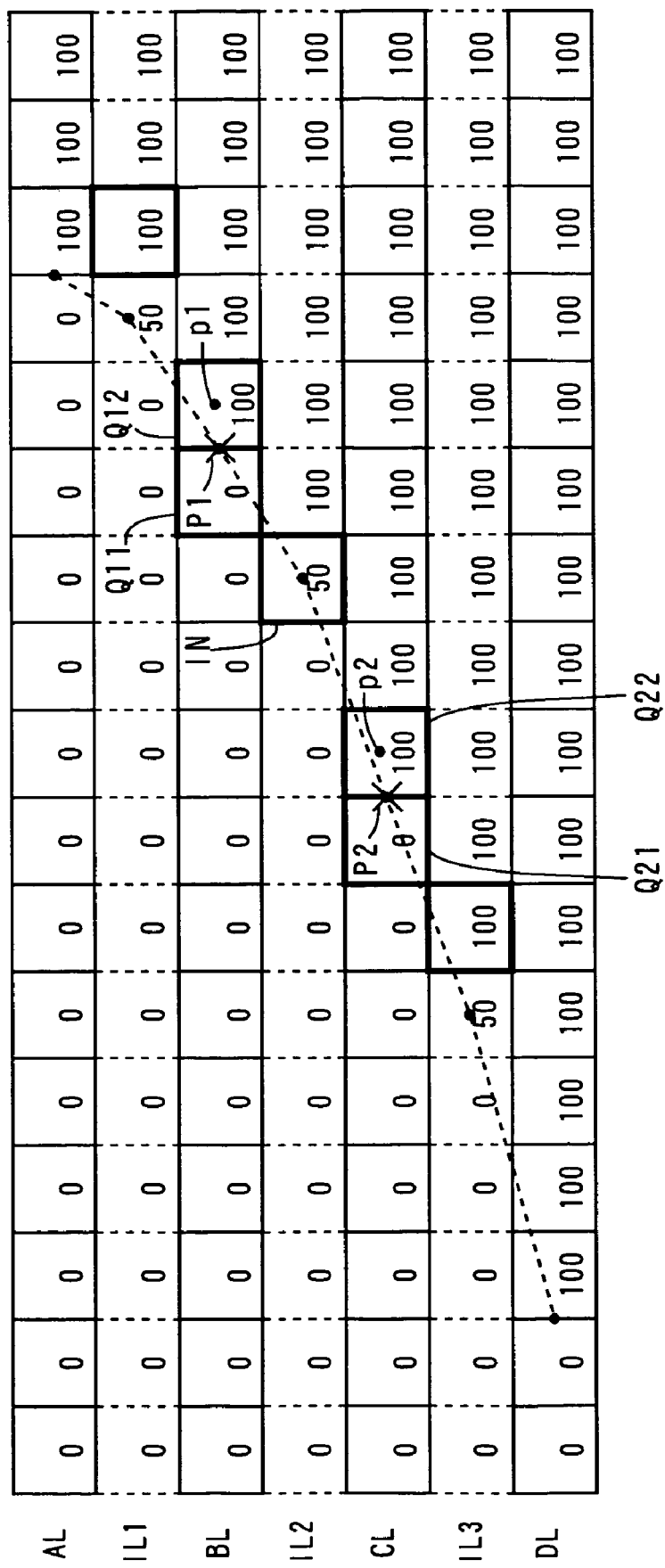
FIG. 11 is a schematic diagram showing an example of interpolation of pixels using the angle information and arc shape information of a picture detected by the picture angle detection apparatus shown in FIG. 1.

FIG. 10 shows an example of angle information of a picture detected by the picture angle detection apparatus 10 shown in FIG. 1. An example of a picture having an arc-shaped edge is shown in FIG. 10. FIG. 11 shows an example of interpolation of pixels using the angle information and arc shape information of the picture detected by the picture angle detection apparatus 10 shown in FIG. 1. In comparison, FIG. 12 shows an example of interpolation of pixels using only the angle information of the picture detected by the picture angle detection apparatus 10 shown in FIG. 1.

In FIGS. 10 to 12, IL1, IL2 and IL3 represent interpolation scanning lines. Also in the figures, AL, BL, CL, and DL represent scanning lines. In FIGS. 10 to 12, the values on the scanning lines AL, BL, CL, and DL represent the luminance values of the pixels. In FIG. 10, the values on the interpolation scanning lines IL1, IL2, and IL3 are the luminance values of interpolation pixels. In FIGS. 11 and 12, the values on the IL1, IL2, and IL3 represent the luminance values of the interpolation pixels.

Here, IN is an interpolation pixel of interest. In this case, IL2 represents an object interpolation scanning line, BL is a scanning line above the interpolation scanning line, CL is a scanning line below the interpolation scanning line, IL1 is an upper interpolation scanning line and IL3 is a lower interpolation scanning line. In FIGS. 11 and 12, the interpolation reference positions P1, P2, P3 and P4 are denoted by x. In the example in FIG. 10, the angle of the object interpolation pixel IN relative to the picture is 27°.

In the example in FIG. 12, the positions directed at 27° to the interpolation pixel IN are selected as interpolation reference positions P3 and P4 in the upper and lower scanning lines BL and CL. The luminance values of the pixels Q3 and Q4 including interpolation reference positions P3 and P4 are both "100" and therefore the luminance value of the interpolation pixel IN is "100" after interpolation operation using the pixels Q3 and Q4 including the interpolation reference positions P3 and P4. The luminance values of the other interpolation pixels are calculated in the same manner, so that the processing result as shown in FIG. 12 is provided.

In the example in FIG. 11, R1 and R2 represent reference pixels for the upper and lower interpolation scanning lines IL1 and IL3, respectively. The angle information of the reference pixel R1 is 45° and the angle information of the reference pixel R2 is 18°. Therefore, the example in FIG. 11 corresponds to Case A in FIG. 7, and the direction of the inside of the arc shape is the left. Consequently, the positions p1 and p2 at 27° relative to the interpolation pixel IN are specified in the upper and lower scanning lines BL and CL, and the positions 0.5 pixel shifted horizontally to the left from these specified positions p1 and p2 are selected as the interpolation reference positions P1 and P2. The luminance values of the pixels including the interpolation positions P1 and P2 are each the average luminance value between the luminance values "100" and "0" of two adjacent pixels Q11 and Q12; Q13 and Q14, in other words, the luminance values are both "50". Therefore, the luminance value of the interpolation pixel IN is "50" after interpolation operation using the pixels including the interpolation reference positions P1 and P2. The luminance values of the other interpolation pixels are calculated in the same manner, so that the result as shown in FIG. 11 is provided.

Note that in FIGS. 11 and 12, the values on the interpolation scanning lines IL1, IL2, and IL3 are the luminance values of interpolation pixels, solid circles each represent the intermediate luminance value for each scanning line, and the dotted line connects the points of the intermediate luminance values. More specifically, the dotted line represents the edge of the picture. In this example, the intermediate value is a luminance value of "50".

In comparison with the result in FIG. 11, the edge shape of the picture after interpolation is bent when the luminance values of the interpolation pixels are calculated only with the angle information of the picture as shown in FIG. 12 and a smooth edge cannot be provided by the interpolation. More specifically, the interpolation in FIG. 12 is carried out in the locally recognized angle directions, and therefore is not necessarily smooth in terms of overall continuity.

In contrast, when the luminance values of the interpolation pixels are calculated based on the angle information and arc shape information of the picture as shown in FIG. 11, a smooth edge approximated to the arc shape can be formed.

Note that in this example, the interpolation reference positions are shifted by 0.5 pixel when an arc shape is recognized, but the invention is not limited to this, and the shift amount can be set as required.

According to the embodiment, the binarizer 2 and the detection window video signal processor 5 correspond to a binary pattern generator, the reference pattern generator 6 to a reference pattern generator and the angle detector 3 to a comparator. The arc shape detector 4 corresponds to a shape detector. The detection window video signal processor 5 corresponds to a threshold value calculation device and a determination device, and the binarizer 2 corresponds to a binarizer.

The invention claimed is:

1. A picture angle detection apparatus for detecting an angle of a picture related to a pixel to be interpolated in each interpolation scanning line between scanning lines based on an input video signal, comprising:
   a binary pattern generator that binarizes said input video signal in a predetermined detection region including a plurality of scanning lines and said pixel to be interpolated to generate a binary pattern;
   a reference pattern generator that generates binary pictures having different directions as a plurality of reference patterns;
   a comparator that compares the binary pattern generated by said binary pattern generator with each of the plurality of reference patterns generated by said reference pattern generator to detect the angle of the picture related to said pixel to be interpolated based on a comparison result; and
   a shape detector that detects the shape of the picture based on a combination of the angle of the picture detected by said comparator related to said pixel to be interpolated and angles of the picture detected in upper and lower interpolation scanning lines, and
   when the angle of the picture detected by said comparator related to said pixel to be interpolated is between the angle of the picture detected in the upper interpolation scanning line and the angle of the picture detected in the lower interpolation scanning line, and the absolute value of the angle of the picture detected in the upper interpolation scanning line is larger than the absolute value of the angle of the picture detected in the lower interpolation scanning line,
   said shape detector outputs a shape detection signal indicating that the shape of the picture is convex toward the lower right, when the angle of the picture detected related to said pixel to be interpolated, and the angle of the picture detected in the upper interpolation scanning line and the angle of the picture detected in the lower interpolation scanning line are positive values, and said shape detector outputs a shape detection signal indicating that the shape of the picture is convex toward the lower left, when the angle of the picture detected related to said pixel to be interpolated, and the angle of the picture detected in the upper interpolation scanning line and the angle of the picture detected in the lower interpolation scanning line are negative values, and when the angle of the picture detected by said comparator related to said pixel to be interpolated is between the angle of the picture detected in the upper interpolation scanning line and the angle of the picture detected in the lower interpolation scanning line, and the absolute value of the angle of the picture detected in the upper interpolation scanning line is smaller than the absolute value of the angle of the picture detected in the lower interpolation scanning line, said shape detector outputs a shape detection signal indicating that the shape of the picture is convex toward the upper left, when the angle of the picture detected related to said pixel to be interpolated, and the angle of the picture detected in the upper interpolation scanning line and the angle of the picture detected in the lower interpolation scanning line are positive values, and said shape detector outputs a shape detection signal indicating that the shape of the picture is convex toward the upper right, when the angle of the picture detected related to said pixel to be interpolated, and the angle of the picture detected in the upper interpolation scanning line and the angle of the picture detected in the lower interpolation scanning line are negative values.

2. A picture angle detection apparatus for detecting an angle of a picture related to a pixel to be interpolated in each interpolation scanning line between scanning lines based on an input video signal, comprising:

a binary pattern generator that binarizes said input video signal in a predetermined detection region including a plurality of scanning lines and said pixel to be interpolated to generate a binary pattern;

a reference pattern generator that generates binary pictures having different directions as a plurality of reference patterns;

a comparator that compares the binary pattern generated by said binary pattern generator with each of the plurality of reference patterns generated by said reference pattern generator to detect the angle of the picture related to said pixel to be interpolated based on a comparison result; and a shape detector that detects the shape of the picture based on a combination of the angle of the picture detected by said comparator related to said pixel to be interpolated and angles of the picture detected in upper and lower interpolation scanning lines, wherein when said shape detector detects that the shape of the picture is an arc, said detector outputs a shape detection signal indicating the direction of the inside of the arc.

3. A picture angle detection apparatus for detecting an angle of a picture related to a pixel to be interpolated in each interpolation scanning line between scanning lines based on an input video signal, comprising:

a binary pattern generator that binarizes said input video signal in a predetermined detection region including a plurality of scanning lines and said pixel to be interpolated to generate a binary pattern;

a reference pattern generator that generates binary pictures having different directions as a plurality of reference patterns;

a comparator that compares the binary pattern generated by said binary pattern generator with each of the plurality of reference patterns generated by said reference pattern generator to detect the angle of the picture related to said pixel to be interpolated based on a comparison result; and a shape detector that detects the shape of the picture based on a combination of the angle of the picture detected by said comparator related to said pixel to be interpolated and angles of the picture detected in upper and lower interpolation scanning lines, wherein said binary pattern generator comprises:

a threshold value calculation device that calculates a threshold value for binarization based on the luminance of a video signal in said detection region; and a binarizer that binarizes said input video signal using the threshold value calculated by said threshold value calculation device to generate said binary pattern.

4. A picture angle detection apparatus for detecting an angle of a picture related to a pixel to be interpolated in each interpolation scanning line between scanning lines based on an input video signal, comprising:

a binary pattern generator that binarizes said input video signal in a predetermined detection region including a plurality of scanning lines and said pixel to be interpolated to generate a binary pattern;

a reference pattern generator that generates binary pictures having different directions as a plurality of reference patterns;

a comparator that compares the binary pattern generated by said binary pattern generator with each of the plurality of reference patterns generated by said reference pattern generator to detect the angle of the picture related to said pixel to be interpolated based on a comparison result; and a shape detector that detects the shape of the picture based on a combination of the angle of the picture detected by said comparator related to said pixel to be interpolated and angles of the picture detected in upper and lower interpolation scanning lines, and a determining device that determines whether or not the luminance distribution in the horizontal direction of each scanning line is in the form of a monotonous increase or a monotonous decrease in the video signal in said detection region, wherein said comparator does not compare said binary pattern with each of said plurality of reference patterns when said luminance distribution is neither in the form of a monotonous increase nor a monotonous decrease.

5. A picture angle detection apparatus for detecting an angle of a picture related to a pixel to be interpolated in each interpolation scanning line between scanning lines based on an input video signal, comprising:

a binary pattern generator that binarizes said input video signal in a predetermined detection region including a plurality of scanning lines and said pixel to be interpolated to generate a binary pattern;

a reference pattern generator that generates binary pictures having different directions as a plurality of reference patterns;

a comparator that compares the binary pattern generated by said binary pattern generator with each of the plurality of reference patterns generated by said reference pattern generator to detect the angle of the picture related to said pixel to be interpolated based on a comparison result; and a shape detector that detects the shape of the picture based on a combination of the angle of the picture detected by said comparator related to said pixel to be interpolated and angles of the picture detected in upper and lower interpolation scanning lines, and a contrast detector that detects a contrast in a video signal in said detection region, wherein said comparator does not compare said binary pattern with each of said plurality of reference patterns when the contrast detected by said contrast detector is smaller than a predetermined value.

6. A picture angle detection apparatus for detecting an angle of a picture related to a pixel to be interpolated in each interpolation scanning line between scanning lines based on an input video signal, comprising:

a binary pattern generator that binarizes said input video signal in a predetermined detection region including a plurality of scanning lines and said pixel to be interpolated to generate a binary pattern;

a reference pattern generator that generates binary pictures having different directions as a plurality of reference patterns;

a comparator that compares the binary pattern generated by said binary pattern generator with each of the plurality of reference patterns generated by said reference pattern generator to detect the angle of the picture related to said pixel to be interpolated based on a comparison result; and a shape detector that detects the shape of the picture based on a combination of the angle of the picture detected by said comparator related to said pixel to be interpolated and angles of the picture detected in upper and lower interpolation scanning lines, wherein the plurality of reference patterns each include a first pixel row arranged in a scanning line above said pixel to be interpolated and a second pixel row arranged in a scanning line below said pixel to be interpolated, and wherein said first pixel row has one transition point from a first pixel value to a second pixel value, said second pixel row has one transition point from a first pixel value to a second pixel value, and the transition direction from the first pixel value to the second pixel value in said first pixel row and the transition direction from the first pixel value to the second pixel value in the second pixel row are the same.

7. A scanning lines interpolation apparatus, comprising:

a picture angle detection apparatus that detects the angle and shape of a picture related to a pixel to be interpolated based on an input video signal; and an interpolation circuit that selects pixels to be used for interpolation based on the angle and shape detected by said picture angle detection apparatus, and calculates the value of said pixel to be interpolated using the selected pixels to generate an interpolation scanning line, said picture angle detection apparatus including:

a binary pattern generator that binarizes said input video signal in a predetermined detection region including a plurality of scanning lines and said pixel to be interpolated in each said scanning line to generate a binary pattern;

a reference pattern generator that generates binary pictures having different directions as a plurality of reference patterns;

a comparator that compares the binary pattern generated by said binary pattern generator with each of the plurality of reference patterns generated by said reference pattern generator to detect the angle of the picture related to said pixel to be interpolated based on a result of comparison; and a shape detector that detects the shape of the picture based on a combination of the angle of the picture detected by said comparator related to said pixel to be interpolated and angles of the picture detected in upper and lower interpolation scanning lines, and when the angle of the picture detected by said comparator related to said pixel to be interpolated is between the angle of the picture detected in the upper interpolation scanning line and the angle of the picture detected in the lower interpolation scanning line, and the absolute value of the angle of the picture detected in the upper interpolation scanning line is larger than the absolute value of the angle of the picture detected in the lower interpolation scanning line, said shape detector outputs a shape detection signal indicating that the shape of the picture is convex toward the lower right, when the angle of the picture detected related to said pixel to be interpolated, and the angle of the picture detected in the upper interpolation scanning line and the angle of the picture detected in the lower interpolation scanning line are positive values, and said shape detector outputs a shape detection signal indicating that the shape of the picture is convex toward the lower left, when the angle of the picture detected related to said pixel to be interpolated, and the angle of the picture detected in the upper interpolation scanning line and the angle of the picture detected in the lower interpolation scanning line are negative values, and when the angle of the picture detected by said comparator related to said pixel to be interpolated is between the angle of the picture detected in the upper interpolation scanning line and the angle of the picture detected in the lower interpolation scanning line, and the absolute value of the angle of the picture detected in the upper interpolation scanning line is smaller than the absolute value of the angle of the picture detected in the lower interpolation scanning line, said shape detector outputs a shape detection signal indicating that the shape of the picture is convex toward the upper left, when the angle of the picture detected related to said pixel to be interpolated, and the angle of the picture detected in the upper interpolation scanning line and the angle of the picture detected in the lower interpolation scanning line are positive values, and said shape detector outputs a shape detection signal indicating that the shape of the picture is convex toward the upper right, when the angle of the picture detected related to said pixel to be interpolated, and the angle of the picture detected in the upper interpolation scanning line and the angle of the picture detected in the lower interpolation scanning line are negative values.

8. A scanning lines interpolation apparatus, comprising:

a picture angle detection apparatus that detects the angle and shape of a picture related to a pixel to be interpolated based on an input video signal; and an interpolation circuit that selects pixels to be used for interpolation based on the angle and shape detected by said picture angle detection apparatus, and calculates the value of said pixel to be interpolated using the selected pixels to generate an interpolation scanning line, said picture angle detection apparatus including:

a binary pattern generator that binarizes said input video signal in a predetermined detection region including a plurality of scanning lines and said pixel to be interpolated in each said scanning line to generate a binary pattern;

a reference pattern generator that generates binary pictures having different directions as a plurality of reference patterns;

a comparator that compares the binary pattern generated by said binary pattern generator with each of the plurality of reference patterns generated by said reference pattern generator to detect the angle of the picture related to said pixel to be interpolated based on a result of comparison; and a shape detector that detects the shape of the picture based on a combination of the angle of the picture detected by said comparator related to said pixel to be interpolated and angles of the picture detected in upper and lower interpolation scanning lines, wherein when said shape detector detects that the shape of the picture is an arc, said detector outputs a shape detection signal indicating the direction of the inside of the arc, and wherein said interpolation circuit selects pixels to be used for interpolation from the inside of the arc based on the shape detection signal output from the shape detector and calculates the value of said pixel to be interpolated using the selected pixels to generate an interpolation scanning line.

9. A scanning lines interpolation apparatus, comprising:

a picture angle detection apparatus that detects the angle and shape of a picture related to a pixel to be interpolated based on an input video signal; and an interpolation circuit that selects pixels to be used for interpolation based on the angle and shape detected by said picture angle detection apparatus, and calculates the value of said pixel to be interpolated using the selected pixels to generate an interpolation scanning line, said picture angle detection apparatus including:

a binary pattern generator that binarizes said input video signal in a predetermined detection region including a plurality of scanning lines and said pixel to be interpolated in each said scanning line to generate a binary pattern;

a reference pattern generator that generates binary pictures having different directions as a plurality of reference patterns;

a comparator that compares the binary pattern generated by said binary pattern generator with each of the plurality of reference patterns generated by said reference pattern generator to detect the angle of the picture related to said pixel to be interpolated based on a result of comparison; and a shape detector that detects the shape of the picture based on a combination of the angle of the picture detected by said comparator related to said pixel to be interpolated and angles of the picture detected in upper and lower interpolation scanning lines, wherein when said shape detector detects that the shape of the picture is an arc, said detector outputs a shape detection signal indicating the direction of the inside of the arc, and wherein said interpolation circuit selects positions shifted in the direction of the inside of the arc by 0.5 pixel from positions in the upper and lower scanning lines in the direction of the angle of the picture detected for the pixel to be interpolated and calculates the value of said pixel to be interpolated using the values of the pixels in the selected positions.

10. A picture angle detection method for detecting an angle of a picture related to a pixel to be interpolated in each interpolation scanning line between scanning lines based on an input video signal, comprising:

binarizing said input video signal in a predetermined detection region including a plurality of scanning lines and said pixel to be interpolated to generate a binary pattern;

generating binary pictures having different directions as a plurality of reference patterns;

comparing said generated binary pattern with each of said generated plurality of reference patterns to detect the angle of the picture related to said pixel to be interpolated based on a comparison result; and detecting the shape of the picture based on a combination of the angle of said detected picture related to said pixel to be interpolated and angles of the picture detected in upper and lower interpolation scanning lines, and when the angle of the picture detected by the comparing related to said pixel to be interpolated is between the angle of the picture detected in the upper interpolation scanning line and the angle of the picture detected in the lower interpolation scanning line, and the absolute value of the angle of the picture detected in the upper interpolation scanning line is larger than the absolute value of the angle of the picture detected in the lower interpolation scanning line, outputting a shape detection signal indicating that the shape of the picture is convex toward the lower right, when the angle of the picture detected related to said pixel to be interpolated, and the angle of the picture detected in the upper interpolation scanning line and the angle of the picture detected in the lower interpolation scanning line are positive values, and the outputting of the shape detection signal indicating that the shape of the picture is convex toward the lower left, when the angle of the picture detected related to said pixel to be interpolated, and the angle of the picture detected in the upper interpolation scanning line and the angle of the picture detected in the lower interpolation scanning line are negative values, and when the angle of the picture detected by the comparing related to said pixel to be interpolated is between the angle of the picture detected in the upper interpolation scanning line and the angle of the picture detected in the lower interpolation scanning line, and the absolute value of the angle of the picture detected in the upper interpolation scanning line is smaller than the absolute value of the angle of the picture detected in the lower interpolation scanning line, outputting a shape detection signal indicating that the shape of the picture is convex toward the upper left, when the angle of the picture detected related to said pixel to be interpolated, and the angle of the picture detected in the upper interpolation scanning line and the angle of the picture detected in the lower interpolation scanning line are positive values, and the outputting of the shape detection signal indicating that the shape of the picture is convex toward the upper right, when the angle of the picture detected related to said pixel to be interpolated, and the angle of the picture detected in the upper interpolation scanning line and the angle of the picture detected in the lower interpolation scanning line are negative values.

* * * * *